United States Patent
Dangi et al.

(10) Patent No.: US 12,287,733 B2
(45) Date of Patent: Apr. 29, 2025

(54) ENHANCEMENTS TO DATAGEN ALGORITHM TO GAIN ADDITIONAL PERFORMANCE FOR L1 DATASET

(71) Applicant: Dell Products L.P., Round Rock, TX (US)

(72) Inventors: Salil Dangi, Mission Viejo, CA (US); Eugene Kim, Irvine, CA (US); Amol Powar, Burlington (CA)

(73) Assignee: Dell Products L.P., Round Rock, TX (US)

( * ) Notice: Subject to any disclaimer, the term of this patent is extended or adjusted under 35 U.S.C. 154(b) by 476 days.

(21) Appl. No.: 17/649,134

(22) Filed: Jan. 27, 2022

(65) Prior Publication Data
US 2023/0236965 A1    Jul. 27, 2023

(51) Int. Cl.
G06F 12/02    (2006.01)
G06F 12/06    (2006.01)

(52) U.S. Cl.
CPC .................................. G06F 12/06 (2013.01)

(58) Field of Classification Search
None
See application file for complete search history.

(56) References Cited

U.S. PATENT DOCUMENTS

| | | | |
|---|---|---|---|
| 3,680,056 A * | 7/1972 | Kropfl | H04L 12/43 709/251 |
| 6,307,938 B1 | 10/2001 | Matyas, Jr. | |
| 6,430,732 B1 | 8/2002 | Hwang | |
| 6,816,093 B1 | 11/2004 | Jaquette | |
| 8,112,802 B2 | 2/2012 | Hadjieleftheriou | |
| 8,223,673 B2 | 7/2012 | Miriyala et al. | |
| 8,290,150 B2 | 10/2012 | Erhart | |
| 8,638,926 B2 | 1/2014 | Schneider | |
| 8,660,994 B2 | 2/2014 | Slater | |
| 9,152,545 B1 | 10/2015 | Vonthenen | |
| 10,038,733 B1 | 7/2018 | Dangi et al. | |
| 10,114,832 B1 | 10/2018 | Dangi et al. | |
| 10,114,850 B1 | 10/2018 | Dangi et al. | |
| 10,163,371 B1 | 12/2018 | Dangi et al. | |
| 10,235,134 B1 | 3/2019 | Dangi et al. | |

(Continued)

FOREIGN PATENT DOCUMENTS

| | | |
|---|---|---|
| CN | 103098016 A | 5/2013 |
| CN | 104272263 A | 1/2015 |

(Continued)

OTHER PUBLICATIONS

Jonathan, "How to flip a specific bit in a byte in C?", Oct. 27, 2013, Stack Overflow (Year: 2013).*

(Continued)

*Primary Examiner* — Hyun Nam
(74) *Attorney, Agent, or Firm* — Workman Nydegger

(57) ABSTRACT

One example method, which may be performed in a dedupe environment, includes receiving a data call from a caller, in response to the data call, generating data that fulfills a portion of the data call, storing the data in a buffer, checking an offset to determine if the offset maps to the buffer, and when the offset maps to the buffer, altering the data that is located at the offset in the buffer. When the offset does not map to the buffer, the generation of data may cease.

20 Claims, 7 Drawing Sheets

(56) References Cited

U.S. PATENT DOCUMENTS

| | | |
|---|---|---|
| 10,638,150 B1 | 4/2020 | Dangi et al. |
| 10,939,132 B2 | 3/2021 | Dangi et al. |
| 10,997,053 B2 | 5/2021 | Dangi et al. |
| 11,283,863 B1 | 3/2022 | Dangi et al. |
| 11,748,316 B2 | 9/2023 | Dangi et al. |
| 2001/0055311 A1* | 12/2001 | Trachewsky .............. H04L 1/20 370/445 |
| 2005/0132123 A1 | 6/2005 | Glaum et al. |
| 2005/0192994 A1* | 9/2005 | Caldwell ................ H03M 7/30 |
| 2006/0150229 A1 | 7/2006 | Blair et al. |
| 2006/0161702 A1* | 7/2006 | Bowlby ................ G06F 11/221 710/71 |
| 2008/0133891 A1* | 6/2008 | Salz .......................... G06F 8/30 712/E9.016 |
| 2008/0140971 A1* | 6/2008 | Dankel ............... G06F 12/0284 711/E12.001 |
| 2008/0162421 A1* | 7/2008 | Brooks ............... G06F 16/5838 |
| 2010/0017436 A1 | 1/2010 | Wolge |
| 2010/0138587 A1* | 6/2010 | Hutson ............... G06F 12/0607 711/E12.001 |
| 2011/0119432 A1 | 5/2011 | Yoon |
| 2011/0299581 A1 | 12/2011 | Le-Gall |
| 2012/0016839 A1 | 1/2012 | Yueh |
| 2012/0114310 A1 | 5/2012 | Hymel et al. |
| 2012/0233135 A1 | 9/2012 | Tofano |
| 2013/0226881 A1 | 8/2013 | Sharma et al. |
| 2013/0308589 A1* | 11/2013 | Liu ....................... H04W 72/21 370/329 |
| 2013/0346703 A1* | 12/2013 | McCauley .......... G06F 12/0862 711/137 |
| 2014/0118541 A1 | 5/2014 | Lasko |
| 2014/0279874 A1 | 9/2014 | Reiter et al. |
| 2016/0103757 A1 | 4/2016 | Liu et al. |
| 2016/0316049 A1* | 10/2016 | Byrne ................ H04M 3/42314 |
| 2017/0220593 A1 | 8/2017 | Tripathy et al. |
| 2018/0309815 A1* | 10/2018 | Dangi ..................... H04L 43/50 |
| 2019/0034450 A1 | 1/2019 | Dangi et al. |
| 2019/0042590 A1* | 2/2019 | Dangi ................... G06F 3/0641 |
| 2020/0029096 A1* | 1/2020 | Rusanovskyy ....... H04N 19/52 |
| 2020/0034243 A1* | 1/2020 | Venkatesan ......... G06F 16/1805 |
| 2020/0334215 A1 | 10/2020 | Dangi et al. |
| 2022/0164510 A1* | 5/2022 | Reid ........................ G06F 30/34 |
| 2022/0391333 A1* | 12/2022 | Veluswamy .......... G06F 9/5016 |
| 2023/0072477 A1 | 3/2023 | Dangi |
| 2023/0236798 A1* | 7/2023 | Dangi ..................... G06F 7/582 708/254 |
| 2023/0236965 A1* | 7/2023 | Dangi ..................... G06F 12/06 707/769 |
| 2024/0314704 A1* | 9/2024 | Li ....................... H04W 52/146 |

FOREIGN PATENT DOCUMENTS

| | | |
|---|---|---|
| CN | 106067892 A | 11/2016 |
| WO | 2016/137203 A1 | 9/2016 |

OTHER PUBLICATIONS

"Data Compression/Evaluating Compression Effectiveness" internet article, Feb. 21, 2017, XP002796742, accessed on Jan. 9, 2020 via: https//en.wikibooks.org/w/index.php?title=Data_Compression/Evaluating_Compression_Effectiveness&oldid=3184899.

Adams, Philip A. & John C. Hax, "A Case for Database Filesystems", Space Mission Challenges for IT 2009 Conference, Lawrence Livermore National Laboratory, LLNL-CONF-413253, 8 pages. (Year: 2009).

International Preliminary Report on Patentability received for PCT Patent Application No. PCT/US2019/053878, mailed on Oct. 28, 2021, 8 pages.

International Preliminary Report on Patentability received for PCT Patent Application No. PCT/US2019/066619, mailed on Oct. 28, 2021, 10 pages.

International Search Report and Written Opinion for PCT/US2019/053878 mailed Jan. 31, 2020.

International Search Report and Written Opinion issued in Application No. PCT/US2019/066632, mailed Mar. 31, 2020.

International Search Report and Written Opinion received for PCT Patent Application No. PCT/US19/066619, mailed on Jun. 23, 2020, 18 pages.

Universal Mobile Telecommunications System; Multiplexing and channel coding; Technical Specification, European Telecommunications Standards Institute Sophia Antipolis Cedex. France, vol. 3-R1, No. V7.3.0 Dec. 1, 2006, XP014036328.

Author Unknown, Mac Performance Guide, Understanding Compressible vs. Incompressible Data, May 6, 2012, macperformanceguide.com/SSD-incompressible-vs-compressible-data.html, p. 1.

Weisstein, Eric W., Goldbach Conjecture, Jun. 7, 2000, mathworld.wolfram.com/goldbachconjecture.html, p. 1.

Bach, Matt, Puget Systems, SSDs: Advertised vs. Actual Performance, Jan. 25, 2013, pugetsystems.com/labs/articles/SSDs-Advertised-vs-Actual-Performance-179/, p. 1-2.

Murty, M. Ram, Prime Numbers and Irreducible Polynomials, May 2002, The Mathematical Association of America, Monthly 109, p. 452.

* cited by examiner

L0+L1 IMPLEMENTATION

ENHANCEMENT TO L1 CHECK IMPLEMENTATION

ENHANCEMENTS TO DATAGEN ALGORITHM TO GAIN ADDITIONAL PERFORMANCE FOR L1 DATASET

RELATED APPLICATIONS

This application is related to U.S. patent application Ser. No. 17/648,777, entitled ENHANCEMENTS TO DATAGEN ALGORITHM TO GAIN ADDITIONAL PERFORMANCE, filed 24 Jan. 2022. The aforementioned application is incorporated herein in its entirety by this reference.

This application is also related to U.S. Pat. No. 10,114,850, Ser. No. 14/489,295 (Data stream Generation Using Prime Numbers) (the "'850 Patent"), and U.S. Pat. No. 10,038,733, Ser. No. 14/489,317 (Generating A Large, Non-Compressible Data Stream) (the "'733 Patent"), both of which are incorporated herein in their respective entireties by this reference.

FIELD OF THE INVENTION

Embodiments of the present invention generally relate to generation of data streams. More particularly, at least some embodiments of the invention relate to systems, hardware, software, computer-readable media, and methods for reducing a number of checks needed to be performed to determine if one or more portions of a data stream require modification or not.

BACKGROUND

Generation of a so-called L1 generation data stream, which may be based on an L0 generation data stream, requires a constant check to determine if the next set of bytes in the L0 data stream that is being used to generate the L1 data stream should be altered. Considering that in some cases at least, the data of the L1 data stream may be generated at high rates, such as about 3+GBPS for example, it is unlikely that the caller, that is, the entity that requested the data stream, is requesting data in the streaming mode, so it is likely that the caller is requesting large chunks of data, such as KBs or MBs, at a time. That is, the caller may be unlikely to be requesting data in a real-time streaming mode. Rather, the caller may be requesting data in large chunks at a time, such as in KB-sized, MB-sized, chunks, or larger. Given this type of call pattern, that is, a pattern involving calls for large amounts of data at one time, there may be an opportunity to speed up the L1 data stream generation process.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
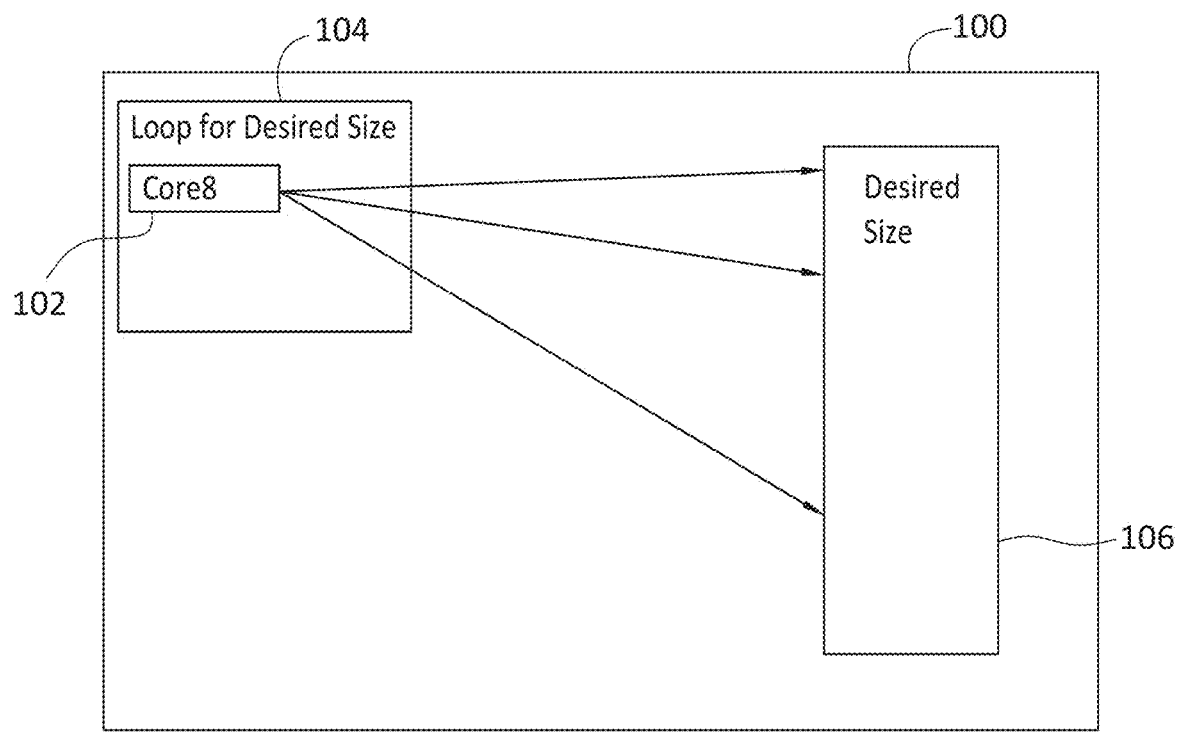
FIG. 1 discloses aspects of an L0 data generation implementation using Core8 data generation.

Embodiments of the present invention generally relate to generation of data streams. More particularly, at least some embodiments of the invention relate to systems, hardware, software, computer-readable media, and methods for reducing a number of checks needed to be performed to determine if one or more portions of a data stream require modification or not.

In general, example embodiments of the invention may be employed in circumstances other than those in which real-time data streaming is to be performed. For example embodiments may be employed in circumstances, such as a non-streaming mode, in which, for example, a caller is requesting large amounts of data in discrete chunks or blobs, such as N MiBs (where N is about 1.0 or larger) at one time. That is, rather than receiving a continuous stream of data pieces, as in a streaming mode where all the data pieces may be the same size as each other, the caller is receiving data in discrete chunks that may or may not be the same size as each other. These chunks may be significantly larger, possibly one, two, or more, orders of magnitude larger than the individual data pieces received in a streaming mode.

One example method may begin by generating L0 data, and keeping information about the start/end offset in a buffer. The method may then pick the next offset from a known L1 modification offset logic and verify if that offset falls under start/end offset. If so, the method may then alter the original data in a specific known way or in a random way and update the instruction to check the current offset against the next offset from the known L1 modification set. The method may keep repeating these operations until the next offset is not found in the buffer (i.e. beyond the end offset applicable to the buffer).

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may operate to reduce the need to perform an L1 check to determine if desired change rate characteristics are being achieved in an L1 data stream. As another example, an embodiment may only alter data, in connection with generation of an L1 data stream, if start/end offsets fall under a known L1 modification offset logic. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

The following is a discussion of aspects of example operating environments, and data stream generation processes, in connection with which one or more embodiments of the invention may be employed. One or more of such operating environments and data stream generation processes may be disclosed in one or more of the Related Applications. This discussion is not intended to limit the scope of the invention, or the applicability of the embodiments, in any way.

Data stream generation processes, such as those disclosed in one or more of the Related Applications, may operate to generate data in increments of 8 bytes when running in 32-bit mode, that is, a mode in which data is generated based on a 32-bit address space. This baseline functionality and/or a module that implements it may be referred to as "Core8" in the description and figures of the present disclosure.

Example embodiments may possess the capability to modify previously generated data (L0 data) resulting in what may be referred to herein as next incremental, or level-1 (L1) data. As part of the level-1 data generation, a specific percentage of data, or change rate, may be specified based on top of L0 data, that is, the L0 data may be modified or changed in a particular way to produce L1 data. Put another way, the L1 data may comprise modified L0 data. To generate L1 data with a specific change rate, data generated by Core8 may be checked, and modified if necessary, to achieve desired change rate characteristics in the data that is being generated. This approach and/or a module that implements it may be referred to as the "L1 Check" in the description and figures of the present disclosure.

In the example case of 32-bit mode operation, when Core8 is invoked, Core8 may generate unique data for 4 billion iterations, after which the data will repeat. That is, data generated after the 4 billion iterations are completed will be non-unique with respect to the data that has already been generated. To deal with this circumstance, embodiments may provide for insertion of a component into the processing pipeline. This component and/or the operations it performs may be referred to as "P1 Check" in the description and figures of the present disclosure. Briefly, the P1 Check may be performed at each iteration of a data generation process to check how many addition operations, performed using a P1 prime number, have been performed. Thus, the P1 Check may need to be performed for each generation of 8 bytes, that is, each cycle of the data generation algorithm. In the example of a data generation process operating in a 32-bit mode, and generation of 8 bytes per iteration, the P1 Check would have to be performed 4 billion times. If, in this illustrative example, the P1 Check reveals that duplicate data is about to be generated, the P1 prime may be modified and an additional 32 GiB of data generated using the modified P1 prime.

With reference now to the example data generation configuration 100 of FIG. 1, an example L0 data generation process is disclosed in which a Core8 process 102 may be invoked and performed 104 until data, which may be in the form of a data stream, of a desired size 106 is generated. A possible advantage of the approach in FIG. 1 may be that it is well suited for streaming data, since no buffering is required. On the other hand, the approach of FIG. 1 may be well suited only for L0 data and, may loop, that is, begin to generate non-unique data after 32 GiB of unique data has been generated. Looping in this way may be undesirable since a caller, that is a requestor of a data stream, may want only unique data to be generated.

Figure 2:
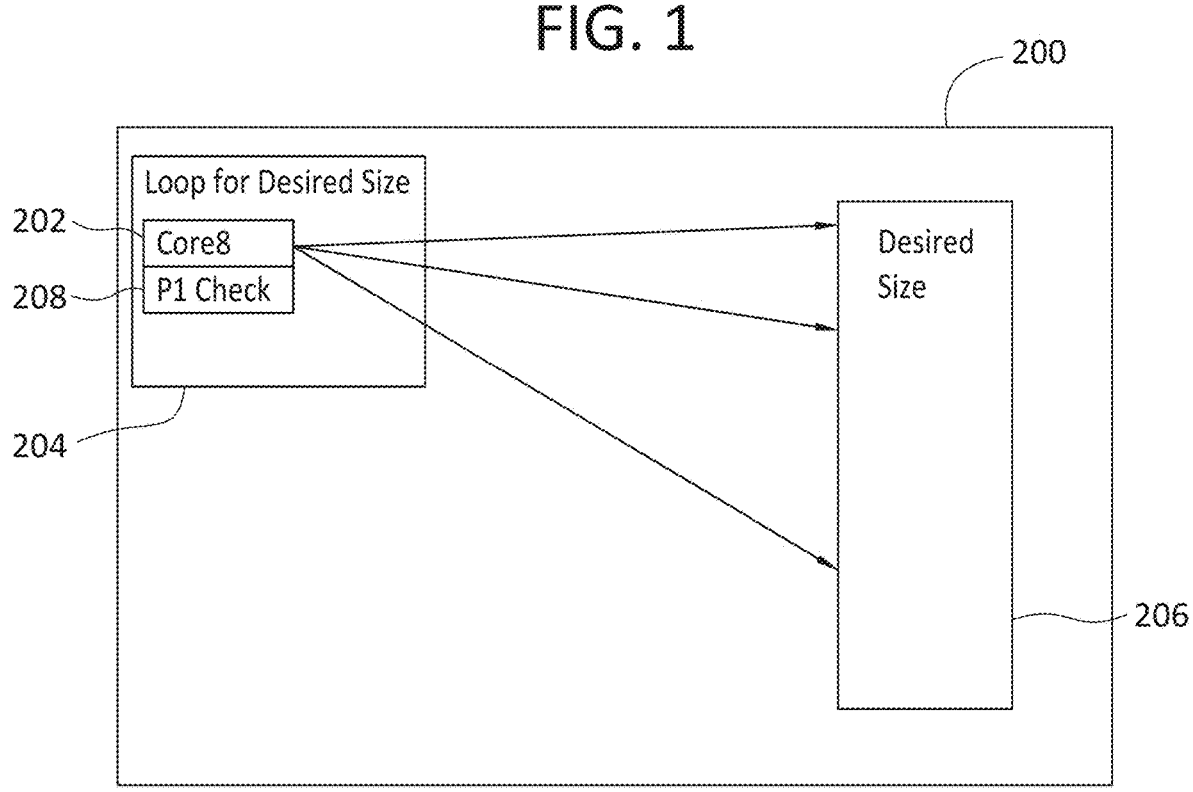
FIG. 2 discloses aspects the L0 data generation implementation as shown in FIG. 1, and further including P1 Checks.

Turning next to FIG. 2, a data generation configuration 200 is disclosed. The configuration 200 may also employ a Core8 process 202 that may be invoked to be performed 204 until data, which may be in the form of a data stream, of a desired size 206 is generated. In the configuration 200, a P1 Check 208 may be performed for each iteration of the Core8 process 202. A possible advantage of the approach in FIG. 2 may be that it is well suited for streaming data, since no buffering is required. As well, the approach of FIG. 2 may, by use of the P1 Check 208, avoid looping after 32 GiB of data have been generated. That is, this approach may eliminate the possibility of generating duplicate data. On the other hand, the approach of FIG. 2 may be limited for use with L0 data. Moreover, while the approach of FIG. 2 may be relatively fast, its performance will, nonetheless, be negatively impacted since a P1 Check 208 would be needed to be performed for each iteration, that is, for each generation of 8 bytes.

Figure 3:
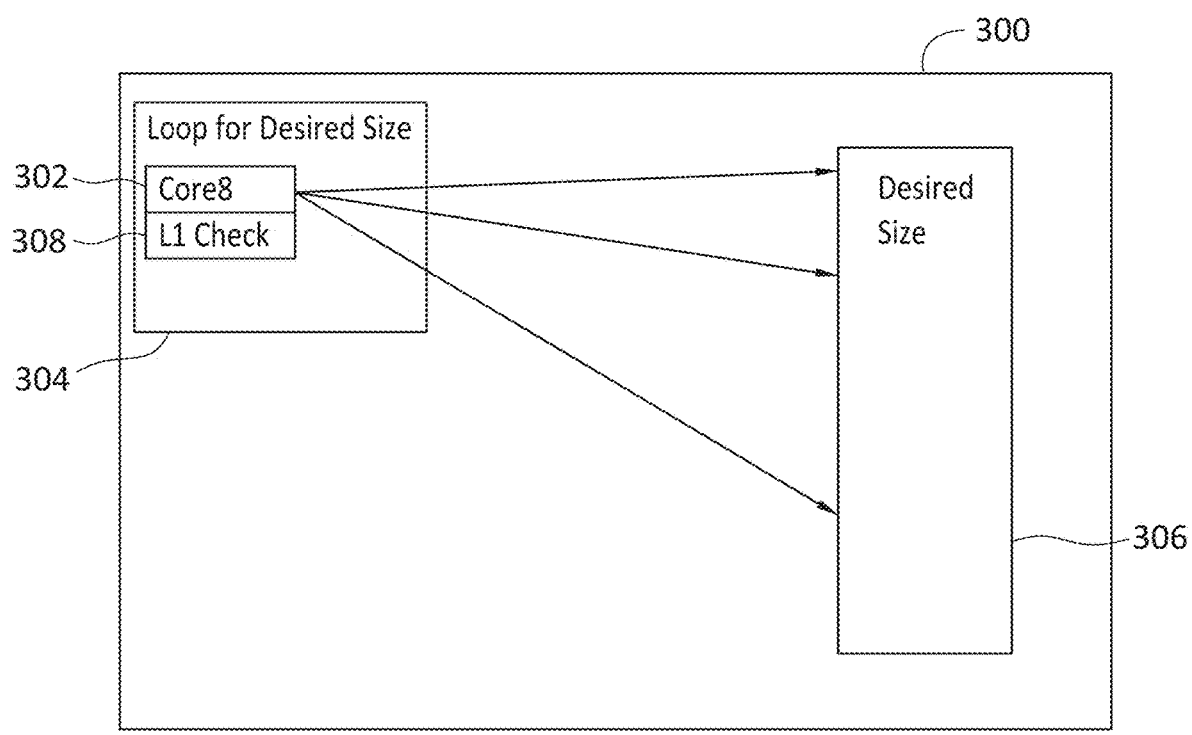
FIG. 3 discloses aspects of an L0+L1 data generation implementation that includes Core8 data generation and L1 Checks.

Turning next to FIG. 3, a configuration 300 for L0+L1 data generation is disclosed. That is, the configuration 300 may be implemented for L0 data generation, and for L1 data generation. In the example of FIG. 3, a Core8 process 302 may be performed 304 until a desired size of data 306 has been generated. In the configuration 300, an L1 Check 308 may be performed for each iteration of the Core8 process 302. A possible advantage of the approach disclosed in FIG. 3 is that it may be well suited for streaming data, since no buffering is required. Further, the approach disclosed in FIG. 3 is not limited for use only with L0 data, but may also be employed with L1 data. That is, the approach of FIG. 3 may be used to generate both L0 data, and L1 data. On the other hand, while the approach disclosed in FIG. 3 may be relatively fast in terms of data generation speeds, its performance may be negatively impacted since an L1 Check 308 may have to be performed for each iteration. Further, the approach disclosed in FIG. 3 may loop after 32 GiB, that is, this approach may begin to generate non-unique data after 32 GiB of unique data has been generated.

Figure 4:
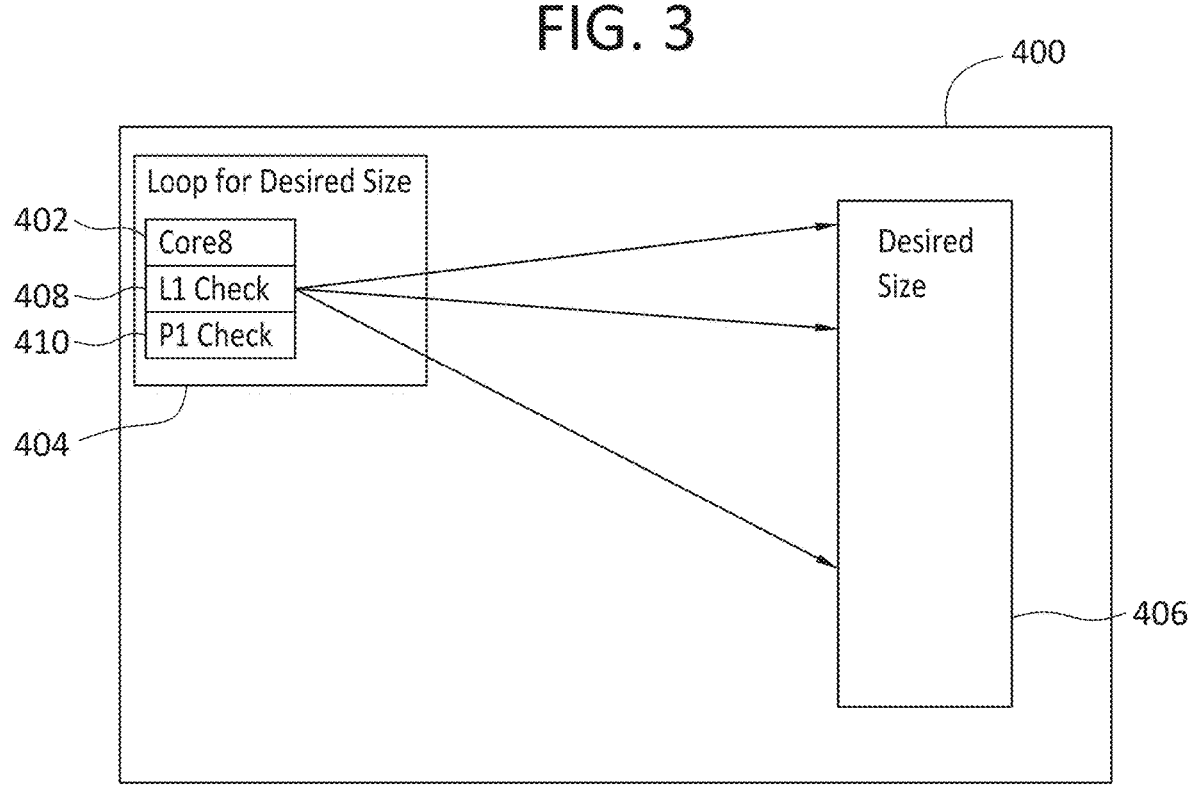
FIG. 4 discloses aspects of an L0+L1 data generation implementation as shown in FIG. 3, and further including P1 Checks.

With reference next to FIG. 4, a data generation configuration 400 is disclosed that may be employed for L0, and L1, data generation. In the example of FIG. 4, a Core8 process 402 may be performed 404 until a desired size of data 406 has been generated. In the configuration 400, an L1 Check 408, and a P1 Check 410, may be performed for each iteration of the Core8 process 402. The configuration in FIG. 4 may be advantageous in that it may be well suited for streaming data since no buffering is required. Further, the configuration 400 may not be limited only to generation of L0 data, but may be able to generate both L0 and L1 data. Finally, the configuration 400 may, by use of the P1 Check 410, avoid looping after 32 GiB of data have been generated. That is, this approach may eliminate the possibility of generating duplicate data. On the other hand, while generation of data with the data generation configuration 400 may be relatively fast, performance may still be adversely impacted since both an L1 Check 408 and a P1 Check 410 may be needed for each iteration.

Figure 5:
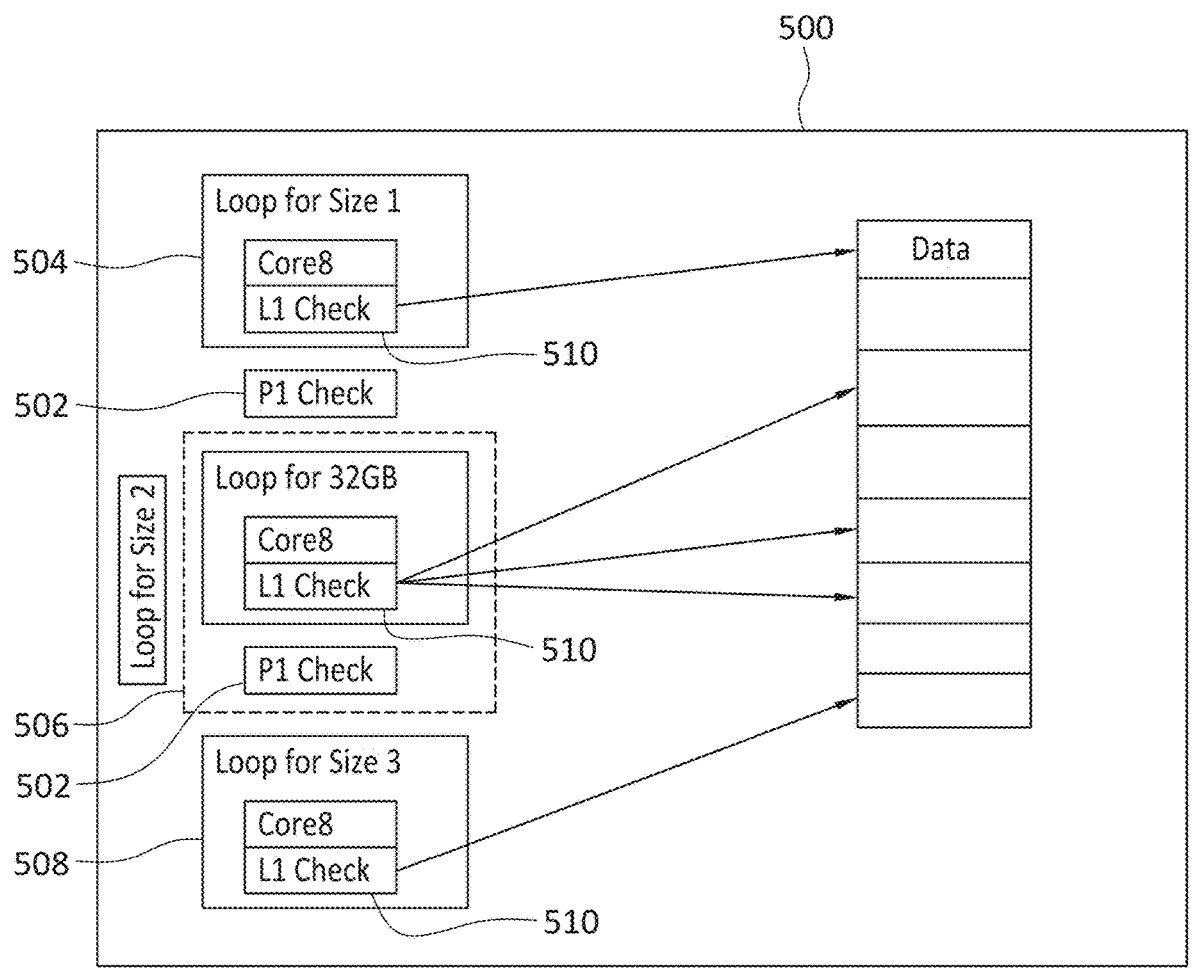
FIG. 5 discloses an enhanced L0+L1 data generation implementation.

In the data generation configuration 500 of FIG. 5, L0+L1 data generation has been enhanced such that P1 Checks 502 may be called only when needed, such as every 4 billion iterations in the case of a 32-bit process. Particularly, this approach employs the property that according to approaches disclosed herein and/or in the Related Applications, a repeat of data will only occur exactly after 232 iterations when implemented on a 32-bit platform. The updated L0+L1 data generation implementation may disengage the P1 Check 502 from the main process pipeline, as shown in the example of FIG. 5**.

Particularly, the example data generation configuration 500 of FIG. 5 discloses various potential data generation loops 504, 506, and 508, which accommodates cases where P1 Check operations would be required, that is, when more than 32 GiB of data is being generated, where there are a series of potential outcomes as set forth in Table 1 below, namely, where:

Size1+Size 2+Size 3 is equal to the Desired Size in one call;

Size 1 is the lesser of the required data or the data remaining in the stream until the next 32 GiB multiple;

Size2 is a multiple of 32 GiB; and

Size 3 is the remaining data required after supplying Size 1 and Size 2 to the caller.

Note that in a typical run, the loop for Size 2, that is, the data generation loop 506, may not be performed unless a very large quantity, such as >32 GiB for example, is requested for generation.

TABLE 1

| Loop | Condition | Action | Outcomes |
|---|---|---|---|
| Loop 1 504 | While remaining size > 0 and not at 32 GiB boundary | Perform Core8 Followed by L1 Check/ modifications | Exit if size1 is complete ELSE Execute P1 Check and proceed to Loop 2. |

TABLE 1-continued

| Loop | Condition | Action | Outcomes |
|---|---|---|---|
| Loop 2 506 | While remaining size is >= 32 GiB perform inner loop for 32 GiB | Perform Core8 Followed by L1 Check/ modifications | If remaining sizes < 32 GiB go to Loop 3. ELSE Perform P1 Check and repeat Loop 2. |
| Loop 3 508 | While remaining size > 0 | Perform Core8 Followed by L1 Check/ modifications | Exit when data is complete. |

A possible result of the operation of the data generation configuration 500 disclosed in FIG. 5 is that such an approach may minimize the number of P1 Checks performed while generating an amount of data. For example, where the desired amount of data requested by a caller is 32 GiB for example, only a single P1 Check 502 may have to be performed, that is, one P1 Check 502 per 4 billion iterations.

The approach disclosed in FIG. 5 may be advantageous in various respects. For example, that approach may be well suited for generation of a large amount of data. Further, the approach of FIG. 5 is not limited only to generation of L0 data, but may generate both L0 and L1 data. As well, the approach of FIG. 5 may, by use of the P1 Check 502, avoid looping after 32 GiB of data have been generated. Finally, when used in connection with the generation of large amounts of data, such as >32 GiB in a 32-bit platform, the number of P1 Checks 502 performed may be greatly reduced. For example, in this 32-bit example, only a single P1 Check 502 may be needed for every 4 billion iterations.

While it may be advantageous in various respects, the approach in FIG. 5 may not be suited for all circumstances. For example, that approach may provide little or no benefit, in terms of the speed of data generation, when small amounts of data are streamed. Further while the approach disclosed in FIG. 5 may enable relatively high speed generation of data, data generation performance may be adversely impacted to some extent since an L1 Check 510 may still be needed for each iteration. Further details concerning example implementations such as set forth in FIG. 5 are disclosed in one or more of the Related Applications.

Figure 6:
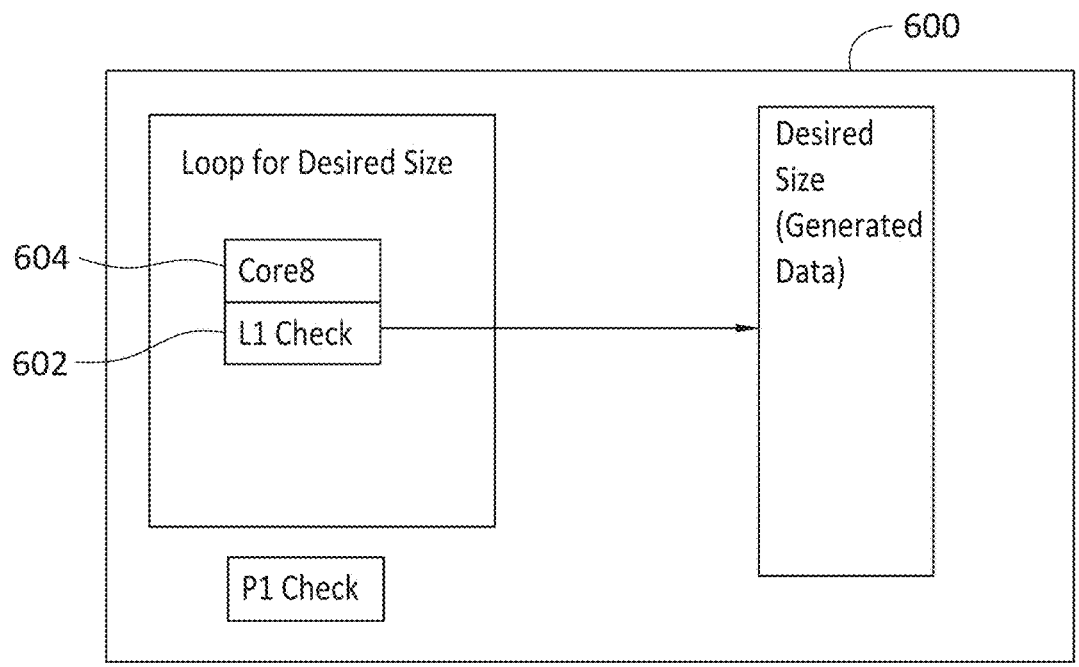
FIG. 6 discloses aspects of an L0+L1 data generation implementation that includes Core8 data generation and L1 Checks, and in which P1 Checks are decoupled from the Core8 data generation and L1 Checks.

With attention now to the example data generation configuration 600 of FIG. 6, background for possible enhancements to L1 data generation is provided. Since the L1 data generation utilizes the enhanced L0 data generation, the L1 data generation may inherit the benefits of enhancements such as the removal of P1 Check from the data generation pipeline. In the L1 data generation, an additional opportunity exists to enhance it further by minimizing L1 Check. As part of L1 data generation, discussed above in connection with FIGS. 1-5, L1 Checks 602 may be performed every time Core8 604 is invoked, that is, every 8 bytes, as shown in the example of FIG. 6.

For example, and with reference to the example of FIG. 6, to generate 800 KB of data would result in 100K Core8 invocations 604, one invocation for each 8 KB of data generated, and 100K L1 Checks 602, one for each 8 KB of data generated. To service a 1% change request on 800 KB of data such as L0 data, only one 8 KB chunk out of 100 chunks of 8 KB would need an L1 modification. Note that that this is true for data streams generated, for example, that may be used to test operations, which may comprise data deduplication operations, in a dedupe environment where comparison for dedup purposes is done on a larger blob of data, such as 8 KB for example. Even a single bit modification in the designated 8 KB may be sufficient to cause the chunk to be different and not de-duplicate. Thus, while the L1 implementation may provide this modification, the modification comes at the cost of performing 100K L1 Checks 602. Here, the L1 Check 602 will basically result in no modification when L0 data is being generated.

The scheme of Core8+L1 Check implemented in the configuration 600 may be needed when the data needs to be streamed in real time. However, the data may be requested by the caller in larger chunks, in larger buffers. Note that the scheme disclosed in FIG. 6 may be particularly well suited for environments/systems that bucketize the data stream, that is, environments/systems that may collect amounts of data in groupings, or 'buckets,' that may then be compared with each other. A bucket may have a particular size, such as 8 KiB for example, that holds chunks of data that are smaller in size than the overall size of the bucket. Examples of such environments/systems include, but are not limited to, dedupe systems such as Avamar/DataDomain from Dell. The example configuration 700 discussed below in connection with FIG. 7 may serve to improve the L1 data generation performance when either the caller is requesting larger amount or with internal buffering.

B. Detailed Aspects of Some Example Embodiments

Figure 7:
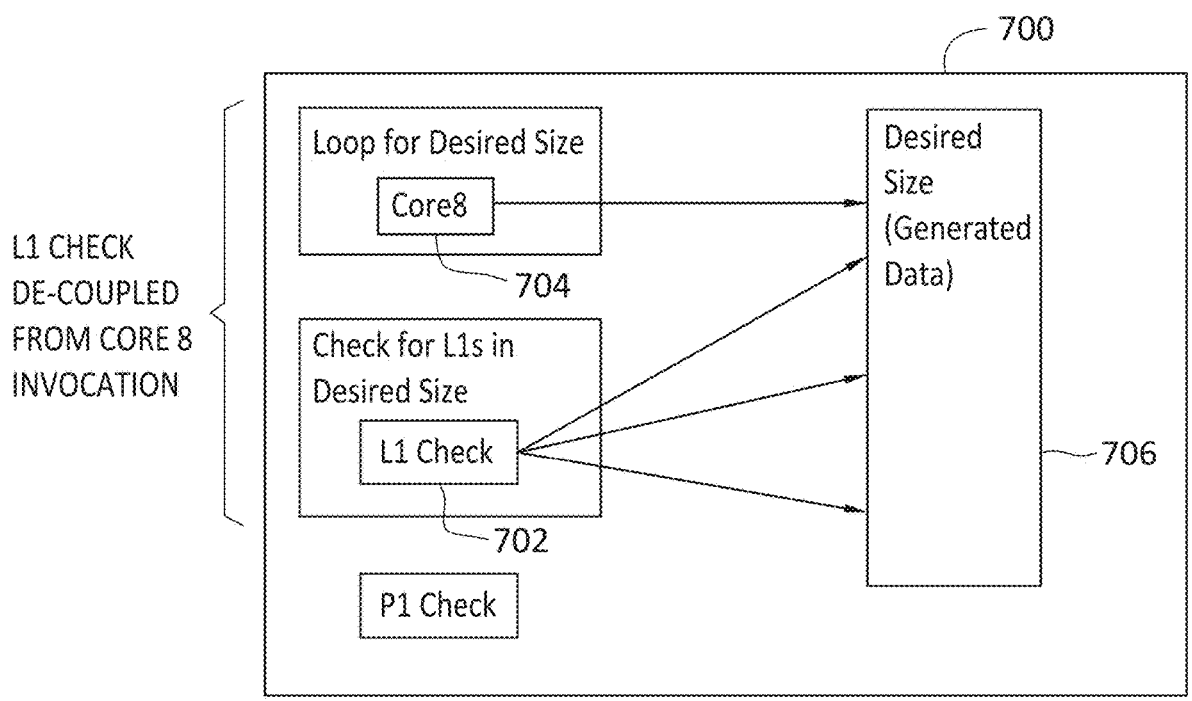
FIG. 7 discloses an enhanced L1 Check implementation.

Turning next to FIG. 7, details are provided concerning aspects of some example embodiments of the invention. Briefly, some example embodiments are directed to enhancements to an L1 Check implementation. More specifically, example embodiments may operate to modify the behavior of a loop, such as that disclosed in FIG. 3 for example, to reduce the number of L1 Checks to be performed. In this way, example embodiments may perform a number of L1 Checks, and only that number of checks, that is consistent with a specified need for L1 changes, based on a desired data change rate.

To this end, and as shown in the example data generation configuration 700 of FIG. 7, example embodiments may operate, and/or be configured, to de-couple an L1 Check 702 from a Core8 invocation 704. For example, if the data generation system is servicing a caller request to perform a 1% change across 800 KB of data, an example embodiment may generate the L0 data 706 using only Core 8 invocations 704 as a first stage of an example data generation method. As a second stage of the example data generation method, an optimized L1 Check 702 may be performed which may result in (1) an L1 modification, or (2) an exit from the loop.

Figure 8:
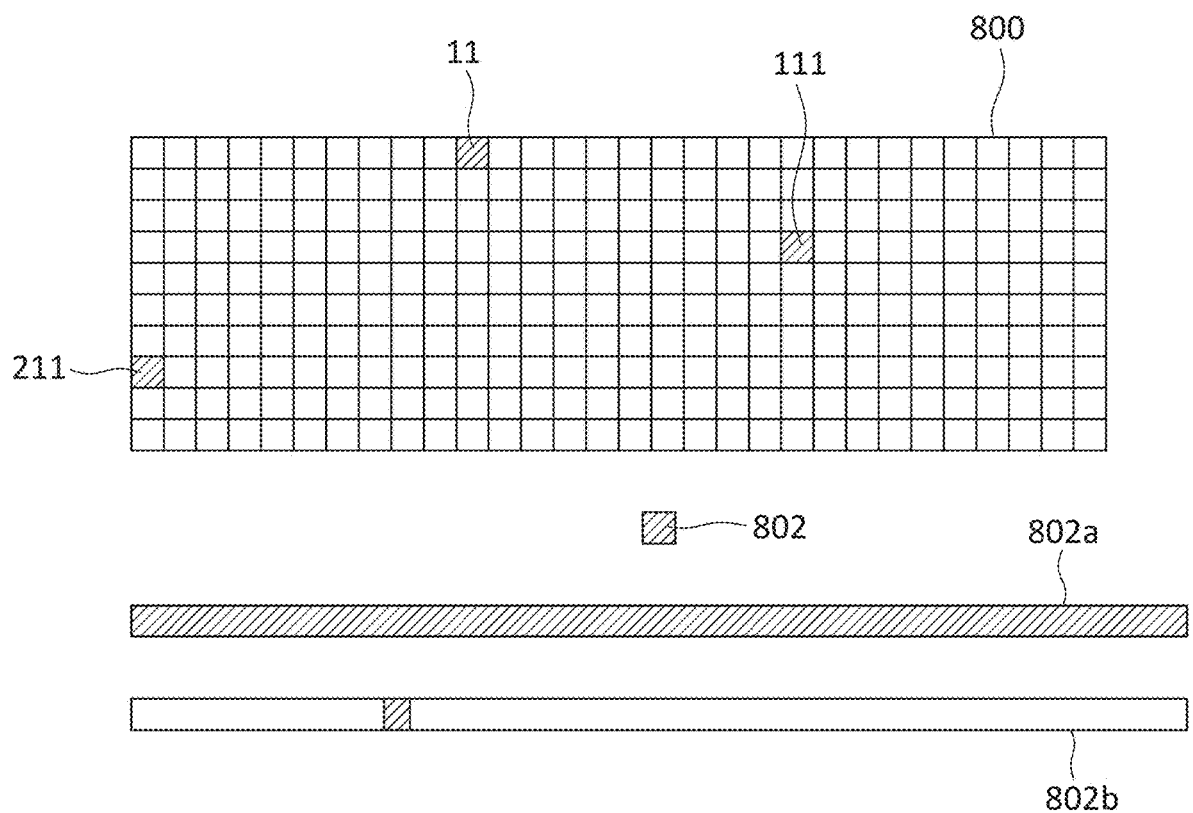
FIG. 8 discloses an example data modification scheme.

In more detail, and with reference now to FIG. 8 and continuing reference to FIG. 7, further details are provided concerning an example L1 Check implementation. In general, FIG. 8 discloses an example grouping 800 of 8 KB data blocks. While the grouping 800 in FIG. 8 includes 300 data blocks, that grouping 800 is solely for the purposes of illustration and is not intended to limit the scope of the invention in any way. FIG. 8 helps to illustrate how L1 changes may be made to obtain the desired results in terms of data change rate and clustering.

B.1 Data Modification—Part 1

Particularly, given a specified data change rate, clustering, and an indication of the blocking/segmentation, an offset logic, that may or may not be separate from the data generation logic, may pre-determine the offsets that need to have values that are different from the L0 values. For example, and with reference to FIG. 8, for a 1% data change rate with uniform distribution, and an average segmentation of 8 KB, it would suffice to alter only 1 block out of a group of 100 blocks of 8 KB. Thus, the offset logic may determine that every 100th block starting at the 11th block must be altered in order to achieve the desired change rate. Thus, in the example of FIG. 8, the uniformly distributed 8 KB blocks 11, 111, and 211, would be modified in some way. Such a modification may be implemented, for example, by altering one or more values in those blocks, but any other suitable form of modification may be employed.

In addition to identifying the blocks that should be modified, the offset logic may also specify particularly where each block targeted for modification should be modified. For example, the offset logic may specify, within each targeted 8 KB block (in the example of FIG. 8), alteration of the data immediately after Core8 iteration #100, that is, keep the first 800 original bytes of the block unmodified, alter the next 8 bytes of the block, and keep the remaining bytes of that block unchanged. In this way, although only 8 bytes of the block have been changed, that block is considered to have been modified. If the modified block is block 11, for example, the next block to be modified would be block 111 in this example. Effectively then, the offset logic has specified: alter at offset 80K+800; offset 800K+80K+800; offset 1600K+80K+800 . . . .

With continued reference to FIG. 8, further details are provided concerning some examples of modified blocks that may be employed in some example embodiments. Suppose, for example, that block 802 has been, or will be, modified. A range of possible modifications to that block 802 are possible. In one case, every bit/byte/word in the entire block 802 may be modified, as shown in the example modified block 802a. In another case, only a single bit/byte/word in the block 802 may be modified, as shown in the example modified block 802b. Further, any intermediate number, between one and all, bits/bytes/words of a block may be modified. More generally, the scope of the invention is not limited to any particular type or form of a modified block. Following is a more detailed discussion of some aspects of example block modifications.

B.2 Data Modification—Part 2

When the data needs to be streamed in real-time without any buffering, there may be only one opportunity to make changes to change the data stream from L0 to L1. In order to make L1 changes then, embodiments may employ an offset module that indicates where the next L1 correction, that is, data change, must be made. An example of this offset module may operate based on parameters such as, but not limited to, the desired data change rate, clustering, and segmentation, and may calculate offsets where the data should be corrected/altered to get the desired result, that is, to change L0 data to L1 data. This offset module may identify and provide the "next" offset, and the next offset may be higher than the previous offset(s).

An example for a 1% data change rate with uniform distribution/clustering on systems that sort of result in 8 KiB segmentation may be as follows (where each 11th 8 KiB block is corrupted or otherwise changed at, for example, 1 KiB from the top):

8 KiB is 0x0000 2000
1 KiB is 0x0000 0400

100 blocks of 8 KiB is 0x000C 8000 (100×0x0000 2000)
10 blocks of 8 KiB is 0x00014000
11th block at offset 1 KiB is:
0x00014000+0x0000 0400=0x00014400.

TABLE 2

| Modified block | Previous | +Distance for 100 blocks | Next Offset for L1 modification |
|---|---|---|---|
| Block 11 | | | 0x0001 4400 |
| Block 111 | 0x0001 4400 | 0x000C 8000 | 0x000D C400 |
| Block 211 | 0x000D C400 | 0x000C 8000 | 0x001A 4400 |
| Block 311 | 0x001A 4400 | 0x000C 8000 | 0x0026 C400 |
| Block 411 | 0x0026 C400 | 0x000C 8000 | 0x0033 4400 |
| Block 511 | 0x0033 4400 | 0x000C 8000 | 0x003F C400 |
| Block 611 | 0x003F C400 | 0x000C 8000 | 0x004C 4400 |
| ... | ... | ... | ... |
| Block 123411 | 0x3C35 C400 | 0x000C 8000 | 0x3C42 4400 |

Assuming an interface of "nextOffset=getNextOffsetForL1Change( )" the offset module will return values of 0x0001 4400, 0x000D C400, 0x001A 4400, 0x0026 C400, 0x0033 4400, 0x003F C400, 0x004C 4400, . . . 0x3C42 4400, as shown in Table 2. When operating in a pure streaming mode, a data generation process may have to check if it has hit the offset or not for each Core8 value that is being generated. This approach causes the data generation process to perform approximately 1M checks for 8 MiB of generated data, that is, 1024 blocks of 8 KiB each.

However, when Core8 values are being generated, and the generated data is still in a buffer, the data generation process may simply check if the data in the buffer represents, or includes, data at the first offset 0x0001 4400. If that offset is not represented by the region in the buffer, then no further check may be needed.

On the other hand, if the buffer has the data represented by the offset 0x0001 4400, then the data generation process may modify, such as by altering, that data, and make a call to getNextOffsetForL1Change to fetch a next offset value, which may be 0x000D C400 in this example. One way that data may be altered is by corruption of that data. Other example data alterations include writing a zero in the data, writing some particular word in the data, flipping all the bits in the data, or entering a value in the data that signifies a particular alteration to the data. In some particular embodiments, various data change parameters, specifying particular alterations to be made to the data stream, may be included in the getNextOffsetForL1Change to build the offsets where the data need to be modified.

More generally, the data may be altered in a deterministic way such that when that same data stream, comprising the alteration(s), is returned, such as to a caller for example, the entity that receives that data stream can verify, based on the alteration(s), that the data stream is correct. Further, even if only a small part of the altered data stream is returned, the entity receiving the data stream may be able to reconstruct the seed that was used to generate that data stream, and may also be able to determine the nature of that data stream, for example, whether the data stream was an L1 data stream or some other generation of a data stream. Finally, the scope of the invention is not limited to any particular type of data alteration type, form, or process.

The data generation process may then continue checking if the new offset is in the buffer. If that next offset is not found in the buffer, indicating that not enough data has been generated such that the new offset has been defined, then no further L1 checks may be needed. Otherwise, it will repeat the loop and perform one or more additional L1 Checks, although no further data may be generated.

In this way, example embodiments may be configured, and operate, to limit the number of L1 Checks that are performed to a minimum when such embodiments buffer the data, rather than streaming the data, and such embodiments may execute, for example, only 10 L1 Checks+the number of calls, in the particular illustrative case where there is a 1% change rate and 8 MiB total data request. For a high speed data stream, such as about 3 GBPS or more, generated by a data generation algorithm, it may be the case that the caller of that data stream will fetch the generated data from a buffer in relatively large amounts, and at discrete times, with a consequent reduction in L1 checks and improved, that is, faster, L1 data generation performance. In some embodiments at least, once the L1 check has begun, no further data generation is performed.

For example, a caller may fetch data from a buffer in 100 KB chunks, or 5 MB chunks, rather than simply requesting small amounts, such as 8 KB at a time. However, even if a caller asks for smaller chunks of data, example embodiments may still provide a substantial reduction in L1 checks as compared with a case where the data is streamed constantly to the caller, rather than in relatively larger chunks. For example, if a caller asks for only 8 KB of data at a time, which would require 1000 calls for 8 MB of total data, example embodiments of the data generation method will make 10 checks for real data modifications plus 1000 additional checks, one check for each call. Thus, the total number of checks would be 1010, which is almost 3 orders of magnitude less than the 1M number of checks that would be performed for the streaming case (1M/1010=990) where data is streamed constantly to the caller, rather than being stored in a buffer and fetched from the buffer in chunks by the caller.

B.3 Further Operational Aspects of Example Embodiments

To illustrate aspects of an example data generation process according to some embodiments of the invention suppose, for the purposes of contrast with such embodiments, that an external interface, such as offset logic for example, takes as inputs the data change rate, clustering information, and data segmentation, and the data generation process may be instructed by the offset logic to alter the data at offset 800, for example. As the data generator, in this example, is generating 8 bytes at a time, the data generation process may be checking to determine if the desired offset, 800 in this example, has been hit, and that check will fail for the first 100 Core8 iterations, where 800 bytes have been generated in total and the data generator has taken no action to modify any data. That is, the generated data has not reached the offset 800 so no data need be modified over the first 100 iterations. Only after data has been generated that starts at the offset 800, will a data change be called for.

Particularly, on the 101st Core8 iteration, the data generator may modify the data that is produced by Core8 and that is located, that is, starting, at offset 800. As well, that offset serves as a basis to determine the next offset that now needs to be checked. Thus, the next offset would be 800K+800. The data generator may then perform another 100K iterations of Core8 to generate an addition 800 KB of data, and check if the data is already at offset 800K+800 or not. Thus, this approach entails the performance of a significant number of checks that all result in a "No Modification" result. While the end result of this approach to L1 Checks ensures that the method does generate the correct value as the Core8 function is being executed, but for a 1% data change, the L1 Check is performed a total of 100K times, but results in only a single positive match, that is, only a single indication that the data should be modified.

With the foregoing contrasting example in view, some example embodiments of a data generation process may run, for example, with the Core8, and save the generated data in a buffer, which may be provided by the user or caller. Once the data is in the buffer, the data generation process may run, or invoke, the correction logic and only alter the values, that is, the data, that needs to be altered according to the data change rate parameter.

Although the generated data may be stored in a buffer, at least some example embodiments do not walk the entire buffer to determine if each value needs alteration, since this approach would result in performing the same number of L1 checks as in the comparative example discussed above. Instead, since the next offset to be altered may be known, due to specification of one or more of an initial offset, a data change rate, change clustering, change distribution, example embodiments may check that offset against the data that exists in the buffer.

Particularly, given that the next offset is known, that is, the offset where the next data modification will occur, various possible outcomes may occur in the operation of example data generation processes according to some embodiments. Examples of such outcomes include the following:

Outcome 1. The next offset was prior to the data range represented by the data in the buffer—this is an error condition and not possible since the data generation process would have already modified the data at that offset earlier.

Outcome 2. The next offset does not map to the data range represented by the buffer—in this case, the data generation process may end, since any data ultimately located at that offset would be handled via a subsequent call.

Outcome 3. The next offset maps to the data range represented by the buffer—in this case, the data generation process may alter the data at that offset in the buffer, which may result in generation of the new next offset, and the data generation process may continue to loop, that is, check that latest offset in the buffer.

Since embodiments may alter only a small amount of data, the number of executions of L1 checks may be reduced, relative to the comparative example, to a minimum. That is, example embodiments may first generate the L0 data and retain the information about the start/end offset in the buffer. Then, the next offset may be picked from the known L1 modification offset logic and a determination made as to whether or not that offset falls within the start/end offset. If so, the data at the offset may be altered, or otherwise modified, and the instructions updated to check the current offset against the next offset from the known L1 modification set. This process may be repeated until the next offset is not found in the buffer. Advantageously, this approach reduces the number of L1 Checks significantly, relative to cases where an L1 check is performed at each iteration of data generation, and only alters the data if start/end offsets fall under the known L1 modification offset logic.

C. Example Methods

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Figure 9:
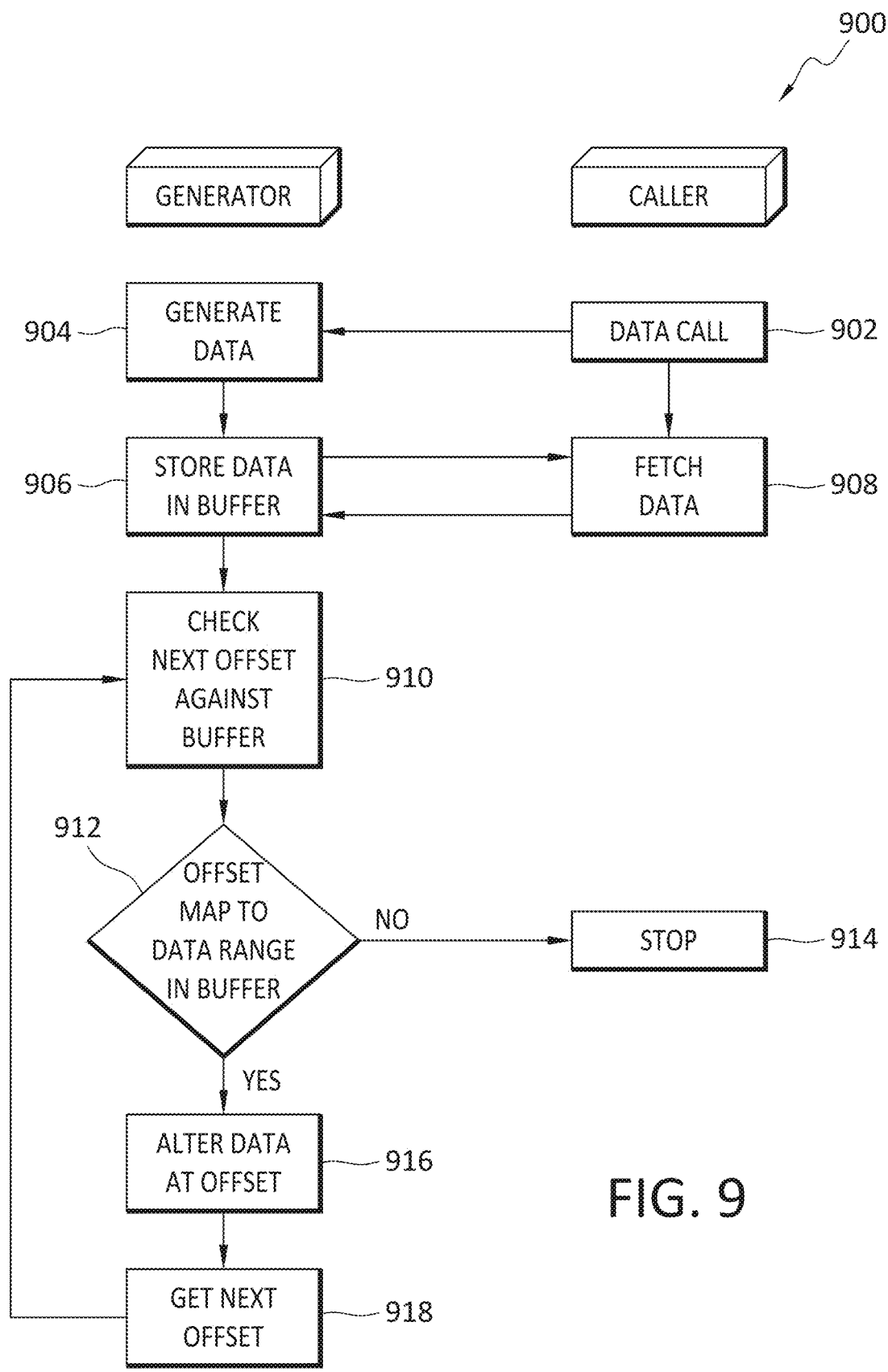
FIG. 9 discloses an example data generation method according to some embodiments.

Directing attention now to FIG. 9, aspects of an example method 900 for data generation are disclosed. Various aspects of the example method 900 may be performed by a data generator, or by a caller. The scope of the invention is not limited to any particular functional allocation however. Further, the order of operations indicated in FIG. 9 is presented by way of example and is not intended to limit the scope of the invention. In alternative implementations, the order of the operations may be different from what is disclosed in FIG. 9.

The method 900 may begin at 902 when a caller issues a data call to a data generator. The caller may issue the data call 902 in order to obtain data that can be used for various purposes by the caller, such as for testing hardware and/or software for example. The data call 902 may specify how much data the caller needs, such as 32 GiB for example, or some other amount. Further, the data call 902 may specify that the caller needs L1 data, or some other form of altered data. The data may be altered, by the data generator, according to a data change parameter specified by the caller, or specified by another entity.

In response to the data call 902, the data generator may generate data 904. The generated data may comprise L0 data, but that is not required. As the data is generated 904, it may be stored 906 in a buffer that is accessible by the caller.

During, or after, storage 906 of the data in the buffer, the initial offset, or next offset, may be checked 910 against the data in the buffer. In general, the aim at this juncture may be to determine whether or not sufficient data has been generated, and stored in the buffer, such that alteration of some of the data in the buffer is required to satisfy a data change parameter. One example of a data change parameter is a specified percentage of the called data that is to be altered.

In the example method 900, the check 910 may comprise determining 912 whether or not the initial offset, or next offset, as applicable, maps to a data range defined in the buffer. That is, the determination 912 may involve checking to see if data is present in the buffer at the offset in question. If not, the alteration of data may stop 914. In more detail, if there is no data present in the buffer at the offset that is being mapped, then no further data alteration may need to be performed.

On the other hand, if it is determined 912 that data is present in the buffer at the offset that is being searched, that data may then be altered 916 according to a data change parameter. In some embodiments, the alteration of the data may comprise flipping one or more bits of that data, but any other alteration that changes the data, and thus fulfills the data change requirement specified by the caller or other entity, may be employed.

After the data has been altered 916, the next offset, that is, the offset immediately following the offset that was determined 912 to map to the data range in the buffer, is calculated 918. The method 900 may then return to 910 where the newly calculated offset may be checked against the buffer.

D. Further Example Embodiments

Following are some further example embodiments of the invention. These are presented only by way of example and are not intended to limit the scope of the invention in any way.

Embodiment 1. A method, comprising: receiving, from a caller, a data call; in response to the data call, generating data that fulfills a portion of the data call; storing the data in a buffer; checking an offset to determine if the offset maps to the buffer; and when the offset maps to the buffer, altering the data that is located at the offset in the buffer.

Embodiment 2. The method as recited in embodiment 1, wherein the data call specifies a data change parameter, and the data is altered according to the data change parameter.

Embodiment 3. The method as recited in any of embodiments 1-2, wherein the method is performed in a data deduplication environment.

Embodiment 4. The method as recited in any of embodiments 1-3, wherein when the offset maps to the buffer, the method further comprises determining a next successive offset after the offset.

Embodiment 5. The method as recited in embodiment 4, wherein the next successive offset is determined based on the offset.

Embodiment 6. The method as recited in any of embodiments 1-5, wherein the method continues to loop until a determination is made that the offset, does not map to the buffer.

Embodiment 7. The method as recited in any of embodiments 1-6, wherein altering the data comprises corrupting the data.

Embodiment 8. The method as recited in any of embodiments 1-7, wherein determining if the offset maps to the buffer is performed without walking all of the buffer.

Embodiment 9. The method as recited in any of embodiments 1-8, wherein the data is only altered when the offset maps to the buffer.

Embodiment 10. The method as recited in any of embodiments 1-9, wherein the data call is received in a non-streaming mode from the caller.

Embodiment 11. A system for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
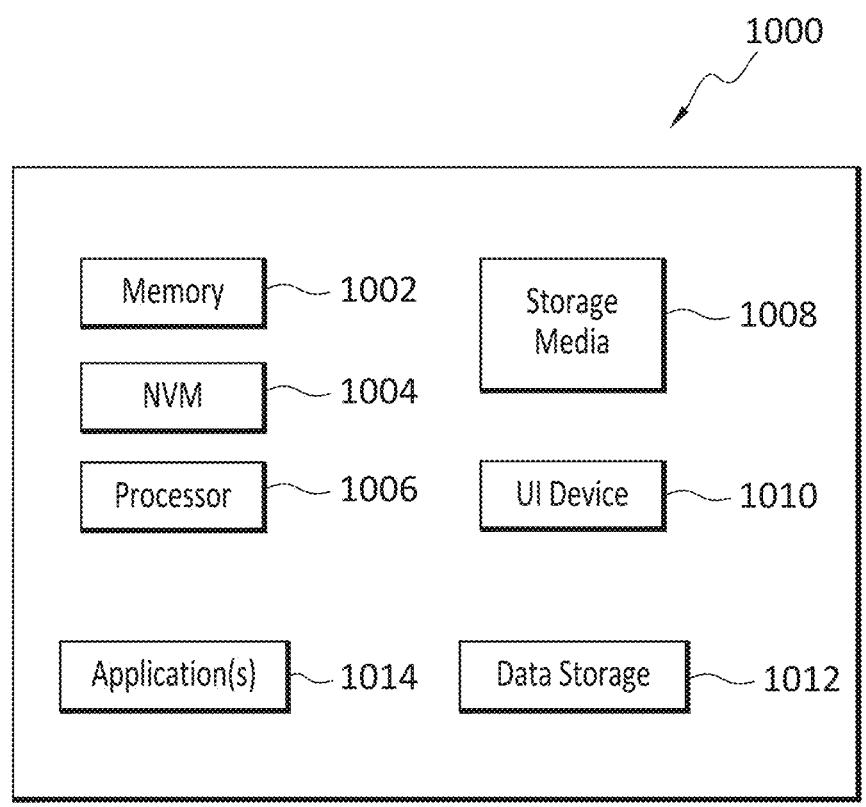
FIG. 10 discloses aspects of an example physical computing entity operable to perform any of the claimed methods, processes, and operations.

With reference briefly now to FIG. 10, any one or more of the entities disclosed, or implied, by FIGS. 1-9 and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving, from a caller, a data call;
in response to the data call, generating data that fulfills a portion of the data call;
storing the data in a buffer;
checking an offset to determine if the offset maps to the buffer; and
when the offset maps to the buffer, altering the data that is located at the offset in the buffer,
and the method continues to loop until a determination is made that another offset, following the offset, does not map to the buffer.

2. The method as recited in claim 1, wherein the data call specifies a data change parameter, and the data is altered according to the data change parameter.

3. The method as recited in claim 1, wherein the method is performed in a data deduplication environment.

4. The method as recited in claim 1, wherein when the offset maps to the buffer, the method further comprises determining a next successive offset after the offset.

5. The method as recited in claim 4, wherein the next successive offset is determined based on the offset.

6. The method as recited in claim 1, wherein the data call comprises a call for discrete chunks, or blobs, of data.

7. The method as recited in claim 1, wherein altering the data comprises modifying the data in a deterministic way.

8. The method as recited in claim 1, wherein determining if the offset maps to the buffer is performed without walking all of the buffer.

9. The method as recited in claim 1, wherein the data is only altered when the offset maps to the buffer.

10. The method as recited in claim 1, wherein the data call is received in a non-streaming mode from the caller.

11. A non-transitory storage medium having stored therein instructions that are executable by one or more hardware processors to perform operations comprising:
receiving, from a caller, a data call;
in response to the data call, generating data that fulfills a portion of the data call;
storing the data in a buffer;
checking an offset to determine if the offset maps to the buffer; and
when the offset maps to the buffer, altering the data that is located at the offset in the buffer,
and the method continues to loop until a determination is made that another offset, following the offset, does not map to the buffer.

12. The non-transitory storage medium as recited in claim 11, wherein the data call specifies a data change parameter, and the data is altered according to the data change parameter.

13. The non-transitory storage medium as recited in claim 11, wherein the operations are performed in a data deduplication environment.

14. The non-transitory storage medium as recited in claim 11, wherein when the offset maps to the buffer, the operations further comprise determining a next successive offset after the offset.

15. The non-transitory storage medium as recited in claim 14, wherein the next successive offset is determined based on the offset.

16. The non-transitory storage medium as recited in claim 11, wherein the data call comprises a call for discrete chunks, or blobs, of data.

17. The non-transitory storage medium as recited in claim 11, wherein altering the data comprises modifying in a deterministic way.

18. The non-transitory storage medium as recited in claim 11, wherein determining if the offset maps to the buffer is performed without walking all of the buffer.

19. The non-transitory storage medium as recited in claim 11, wherein the data is only altered when the offset maps to the buffer.

20. The non-transitory storage medium as recited in claim 11, wherein the data call is received in a non-streaming mode from the caller.

* * * * *